March 26, 1963     S. J. KOLNER     3,083,193
PYROLYSIS OF POLYOLEFINS IN A WATER SLURRY
Filed June 30, 1960
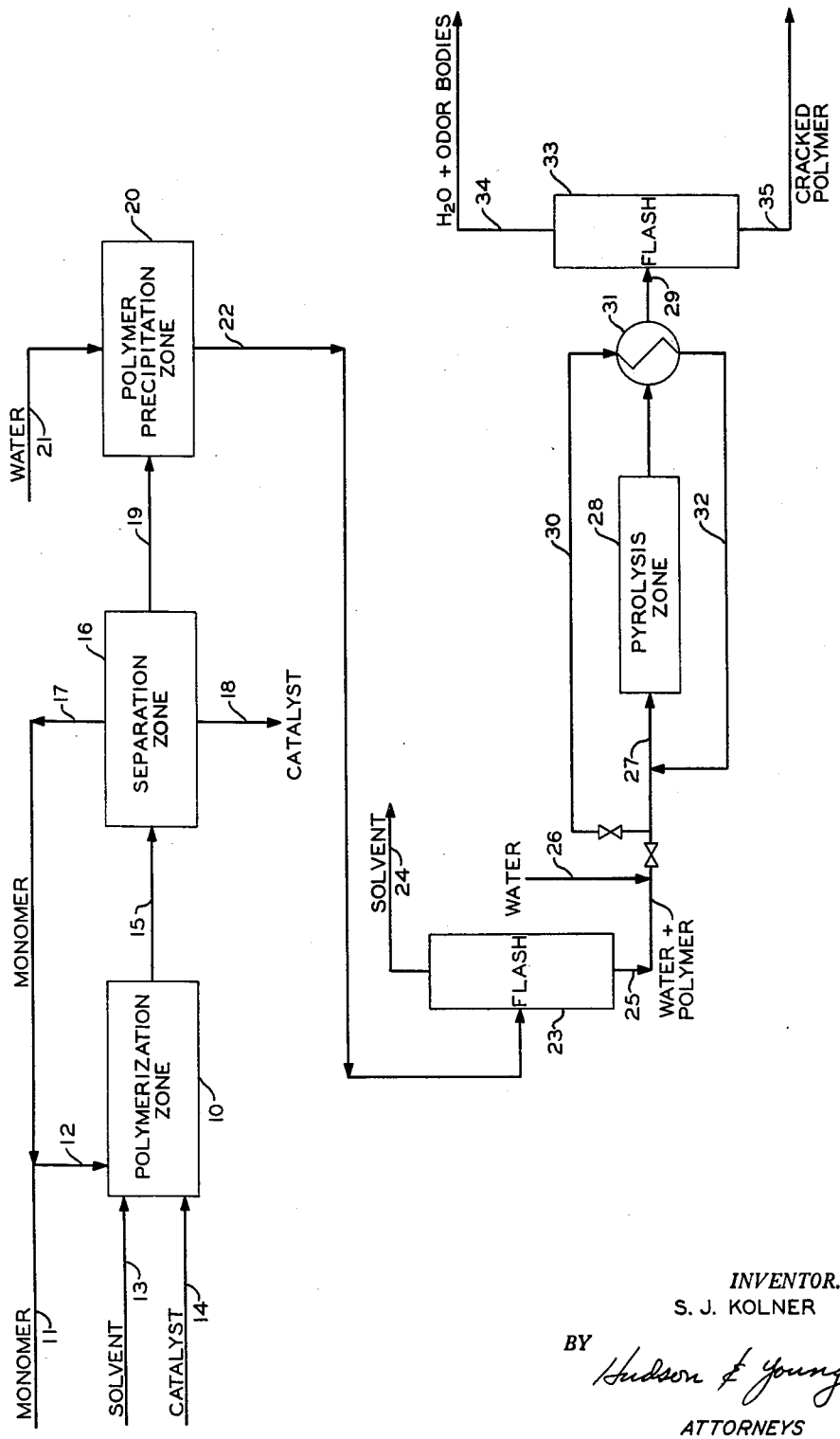
INVENTOR.
S. J. KOLNER
BY *Hudson & Young*
ATTORNEYS 3,083,193
**PYROLYSIS OF POLYOLEFINS IN A
WATER SLURRY**
Samuel J. Kolner, Bartlesville, Okla., assignor to Phillips
Petroleum Company, a corporation of Delaware
Filed June 30, 1960, Ser. No. 39,906
5 Claims. (Cl. 260—94.9)

This invention relates to the pyrolysis of polymers and resulting products. In accordance with one aspect, this invention relates to an improved process for pyrolyzing solid polymers of 1-olefins, especially solid polymers of ethylene. In accordance with another aspect, this invention relates to the cracked polymeric product obtained from said process.

The pyrolysis of polymers to form lower molecular weight materials is well known in the art. Also, various processes have either been proposed or used to pyrolyze solid polymers. One such method involves heating the polymer in an extruder and maintaining the polymer at an elevated temperature for the required length of time. However, although several of these known processes have achieved reasonable success in pyrolyzing solid polymers, it can be safely stated that there is still room for improvement, particularly with regard to an efficient, continuous process for subjecting solid polymers to pyrolysis in less expensive and less complicated equipment. The present invention relates to such an improvement wherein solid polymers can be effectively and efficiently subjected to cracking or vis-breaking to form a lower molecular weight polymeric material in a continuous and simplified manner.

Accordingly, an object of this invention is to provide a simplified and advantageous continuous process for pyrolyzing solid polymers.

Another object of this invention is to provide an improved process for pyrolyzing solid polymers of 1-olefins, especially polymers of ethylene.

Another object of this invention is to modify the properties of solid polymers of 1-olefins, such as polymers of ethylene, by pyrolysis.

Other aspects, objects, as well as the several advantages will become apparent upon a study of this disclosure, the drawing, and appended claims.

In accordance with the present invention, solid polymers, especially solid polymers of 1-olefins, particularly solid polymers of ethylene, are subjected to pyrolysis as finely divided solids or mobile particulate solids dispersed in water. Water is substantially a non-solvent for, insoluble in, and chemically inactive with, the polymer at the pyrolysis conditions. Also, water is an excellent heat transfer liquid and therefore provides good heat transfer and good temperature control of the cracking operation.

Specifically, I provide an improved process for pyrolyzing solid polymers, especially solid polymers of 1-olefins, to a lower molecular weight polymeric material which comprises dispersing a finely divided or particulate solid polymer in water, passing the dispersion thus formed through a pyrolysis zone at a temperature of at least about 500° F. but maintaining the water substantially in the liquid phase to crack said polymer to said lower molecular weight material, separating water from the pyrolysis zone effluent, and recovering cracked polymer as a product of the process.

The polymers that can be pyrolyzed in accordance with the present invention include solid polymers and copolymers of aliphatic mono-1-olefins such as ethylene, propylene, 1-butene, etc. The invention is particularly applicable to polymers of olefins having 2 to 8 carbon atoms per molecule and no branching nearer the double bond than the 4-position. The polymers that can be preferably pyrolyzed with my invention are ethylene polymers having a density in the range of 0.910 to 0.990 gram per cc. at 25° C., preferably a density of at least 0.920. These polymers include polyethylene and also copolymers of ethylene with mono-olefins having 3 to 4 carbon atoms per molecule, i.e., propylene, 1-butene, and 2-butene. It is preferred to use polyethylene having a density at 25° C. of at least 0.940. It is also within the scope of this invention to pyrolyze propylene polymers having a density in the range 0.880 to 0.920.

Solid polymers, particularly polyolefins or 1-olefin polymers, especially polymers of ethylene, that can be pyrolyzed in accordance with the present invention, can be prepared by any of the known methods which are usually employed in the preparation of these polymers. One method of preparing polymers of 1-olefins is the chromium oxide-catalyzed polymerization described in the Hogan et al. patent, 2,825,721 (1958). The polyolefins prepared by the Hogan et al. method are characterized by their high density and high percentage of crystallinity at normal atmospheric temperature. The polyethylenes so produced have unsaturation that is preponderantly of the terminal vinyl and/or trans-internal structure. "Branched vinyl" unsaturation is substantially absent. When the Hogan et al. process is operated under conditions to produce the polymer in solution, the inherent viscosity of the polymer is ordinarily in the range 0.4 to 2.6, preferably in the range 0.7 to 2.6.

It is also known that, in one modification of the Hogan et al. process, an ethylene polymer having an inherent viscosity in the range 3 to 30, usually 3 to 20, can be produced in high yields by contacting ethylene, or mixtures of ethylene with minor proportions of other unsaturated hydrocarbons, with a suspension of the chromium oxide-silica-alumina catalyst. This modification is conducted by contacting the olefin or olefins with the catalyst at a temperature such that substantially all of the polymer produced is insoluble in the liquid diluent, when such diluent is used, and is in solid particulate form, the particles being substantially nontacky and nonagglutinative and suspended in the liquid diluent. This process has been referred to as the "suspension" process or the "particle-form" process. It can be conducted with or without a diluent, but a diluent is often preferred because it facilitates temperature control.

When utilizing butane and higher paraffinic hydrocarbons as the diluent or reaction medium in the suspension process, the polymerization temperature is generally in the range of about 230° F. and below, preferably 225° F. and below. Propane, having a critical temperature of about 206° F., is useful in the temperature range in which it can be maintained in the liquid phase. The temperature range for naphthenic hydrocarbons is about 190° F. and below, preferably about 180° F. and below. If mixtures of paraffinic and naphthenic hydrocarbons are employed, the upper temperature limit is between 190 and 230° F., depending upon the composition of the mixture.

In addition to the foregoing methods of preparing the 1-olefin polymers, especially polyethylene, the invention also includes within its scope solid polymers prepared by organometal polymerization, such as trialkyl aluminum, in conjunction with a titanium halide or polyolefins prepared by the high pressure polymerization process which employ peroxide or other oxygen carrier as a catalyst.

Density of the polymer as used herein is determined by placing a pea-sized specimen cut from a compression molded slab of the polymer in a 50-ml., glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73–78° F. the balance is adjusted until the pointer is at zero. The value shown on the scale is taken as the specific gravity.

Inherent viscosity is determined by measuring the time required for a filtered solution of 0.1000 gram of the polymer in 50 ml. of tetralin (measured at 75° F.) to run through the marked length on a size 50 (0.8 to 3.0 centistokes) Ostwald-Fenske viscosimeter at a temperature of 130° C., the viscosimeter being immersed in a thermostatically controlled oil bath, and measuring also the time required for an equal volume of tetralin containing no polymer to run through the same distance on the same viscosimeter. The inherent viscosity is calculated by the following formula:

$$\eta = \frac{\log V_r}{C}$$

wherein $C=0.183$ and $V_r=$time in seconds required for solution to run through viscosimeter divided by the corresponding time required for the polymer-free tetralin, both at 130° C.

The finely divided solid polymers that can be employed for pyrolysis in accordance with the present invention can be obtained from any method known to the art, for example, solution polymerization, suspension polymerization, gas phase polymerization, liquid phase polymerization, and the like. The important feature of the invention being recovery of the solid polymer in particulate or finely divided form and suspending same in water before subjecting the polymer to pyrolysis.

The polymer particles to be pyrolyzed can have a size in the range 5 to 325 mesh (U.S. Standard Screen sizes), preferably 10 to 50 mesh; and a bulk density in the range 1 to 30 pounds per cubic foot, preferably 10 to 25 pounds per cubic foot. It is particularly advantageous to use particles having a porous structure such as the type produced in suspension and gas phase processes and the type produced by precipitation of polymer from a solution. The water suspension of polymer used in the invention can contain 1 to 10 percent polymer, preferably 2 to 5 percent.

The controlled cracking or vis-breaking operation of this invention comprises heating such a polymer suspended in water as finely divided particles at a temperature of at least 500° F., preferably at least 600° F., and a residence time of from about 1 to about 10 minutes and a pressure sufficiently elevated to maintain the water in liquid phase. Generally, the time of heating is governed by the temperature employed and properties of the product desired. As will be recognized by those skilled in the art of hydrocarbon pyrolysis, the reaction is a so-called "time-temperature" reaction, i.e., a given amount of conversion can be effected by using either a high temperature and a short time or a low temperature and a long time in the pyrolysis zone. High temperatures favor high conversions and low temperatures favor low conversions. Variation of residence time has a similar effect. Therefore any combination of time and temperature can readily be selected to obtain the desired conversion and product. With these principles in view, it will be readily apparent to those skilled in the pyrolysis art that the foregoing numerical ranges of temperature and time are not absolutely limiting. If desired, catalysts can be used during pyrolysis to alter the cracked polymeric product from certain polymers.

The controlled cracking or pyrolysis of the polymers can be carried out as a batch or continuous process. When the latter method is employed, a long tubular cracking zone can be provided with a suitable heating means. The suspended polymer is introduced at one end of the cracking tube and an outlet is provided at the opposite end wherein the water and cracked polymer product are passed to a separation zone for removal of water. As indicated above, the temperature and residence time control the type of product obtained. The longer the heat is applied and the higher the temperature, the lower is the molecular weight of the product.

The cracked polymeric product obtained by the present invention has numerous uses. One valuable application is in coating and impregnating paper to make containers for both hot and cold liquids. Also, a modified polymer obtained according to this invention can be molded to form shaped articles such as bottles, dishes, tumblers, and similar utensils as well as being extruded to form tubing, electrical insulation, etc., or to form sheets, films, etc., for packaging.

A better understanding of this invention will be obtained upon reference to the accompanying drawing which is a schematic flow diagram of one specific embodiment of the invention wherein the polymer recovered from the effluent from a solution polymerization process is pyrolyzed.

Referring now to the drawing, a monomer feed stream, e.g., ethylene, is passed to polymerization zone 10 by way of conduits 11 and 12. The monomer feed stream can be a 1-olefin or mixture of 1-olefins such as ethylene with other unsaturated hydrocarbons, for example, mixtures of ethylene with minor amounts of higher 1-olefins such as propylene, 1-butene, 1-pentene, 1-hexene and the like. Catalyst is introduced into polymerization zone 10 by way of conduit 14. The catalyst will usually be dispersed in at least a portion of the solvent. The catalyst can be, for example, a chromium oxide-silica alumina catalyst such as described in the Hogan et al. patent, supra. Any additional solvent needed is added to polymerization 10 by way of conduit 13. The ingredients in each of these conduits 11, 13, and 14 are preferably at polymerization temperatures (230–300° F.), however, one or more streams can be cooler with the remaining streams warmer. It should also be understood that the 1-olefin and solvent can be premixed if desired. The polymerization reaction is exothermic so that it is necessary to remove heat from the polymerization zone. This can be accomplished, for example, by indirect heat exchange (not shown).

The polymerization effluent removed from zone 10 at about 280° F. is passed by conduit 15 to monomer and catalyst removal zone 16 wherein unreacted monomer is vaporized and removed by conduit 17 and passed to monomer recycle line 12. Catalyst is removed from the polymer effluent by filtration or centrifugation and exits by way of conduit 18. The polymer solution, which is substantially free of monomer and catalyst, is passed to polymer precipitation zone 20 by way of conduit 19. In zone 20 the polymer solution is contacted with water of lower temperature introduced by conduit 21 so as to cause polymer to precipitate as finely divided particles. A dispersion containing precipitated polymer, water and solvent is removed from zone 20 by conduit 22 and passed to separation zone 23 wherein solvent is flashed overhead through conduit 24, and precipitated polymer suspended in water is recovered in conduit 25.

In accordance with the present invention, the slurry of finely divided precipitated polymer and water is passed by way of conduit 27 to pyrolysis zone 28, e.g., a cracking tube, wherein it is subjected to cracking conditions. If desired, additional water can be added to the slurry before pyrolysis by way of conduit 26. The water slurry of finely divided polymer is passed through pyrolysis zone and subjected to temperatures of at least 500° F., preferably a temperature of at least 600° F., and at a pressure sufficiently elevated to maintain the water in the liquid phase. The slurry is maintained in the pyrolysis zone until the desired degree of cracking is obtained. The pyrolysis zone effluent comprising water and the cracked polymeric material is removed by conduit 29, passed through heat exchanger 31, and then to separation zone 33 wherein water and odor producing materials formed during the pyrolysis are removed overhead by way of conduit 34. Cracked polymeric product is removed from zone 33 by way of conduit 35.

If desired, the slurry of polymer and water can be heat exchanged before pyrolysis with the pyrolysis zone effluent in heat exchanger 31 by by-passing zone 28 through conduits 30 and 32. Also, as an alternative to flashing the water from the cracked polymer, the cracked polymer is allowed to collect in the top of a phase separator from which the polymer can be withdrawn by an extruder. This alternative would have the advantage that the water need not be condensed and repressured but would not be as effective for removal of odor bodies from the cracked polymer as is the flashing step.

In the case of preparing a polymer in particulate form by the suspension process, the polymer in suspension with the diluent is removed from the polymerization zone and passed to a separation zone wherein monomer and diluent are recovered and recycled to the polymerization zone. The particulate polymer recovered from the separation zone can then be slurried with water and then passed directly to pyrolysis zone 28 as in the above described embodiment.

*Example I*

A high molecular weight polyethylene was prepared according to the suspension process. A slurry of catalyst and normal pentane was charged to a reactor provided with a mechanical stirrer. The catalyst was prepared by impregnating a silica-alumina support with an aqueous solution of chromium trioxide. The resulting composite was dried and activated by heating in dry air at approximately 950° F. The final catalyst contained approximately 2 weight percent total chromium, most of which was in the hexavalent state. Pure grade ethylene was metered into the reactor and a slurry of solid product polymer and catalyst and normal pentane was continuously withdrawn and additional pentane, catalyst, and ethylene were continuously added. The polymer was recovered from the withdrawn mixture by vaporizing the pentane. However, no catalyst separation was made. A reactor temperature of 210° F. and a reactor pressure of 450 p.s.i.g. were maintained during the run. The polymer product has a particle size distribution as follows:

Percent retained on No. 10 screen _____ 2.5
Percent retained on No. 20 screen _____ 52.7
Percent retained on No. 40 screen _____ 34.7
Percent retained on No. 80 screen _____ 8.2
Percent retained on No. 100 screen _____ 0.8
Pan _____ 1.2

The bulk density of the polymer is about 14 pounds per cubic foot.

The polyethylene produced is slurried with water to form a mixture containing 3 weight percent particulate solid polyethylene. The polymer slurry is heated to a temperature of about 600° F. and then passed through the cracking tube maintained at a temperature of 650° F. The slurry is retained in the tube for 3 minutes. The resulting pyrolyzed polymer is removed from the pyrolysis tube, flashed to release water and odor bodies, and the cracked polymer as product recovered. The unpyrolyzed polymer had an inherent viscosity of 5.3 whereas the pyrolyzed polymer had an inherent viscosity of 1.3.

*Example II*

An ethylene-butene copolymer was prepared by the solution process. An olefin stream containing 95 percent ethylene and 5 percent butent-1 and a stream of a catalyst similar to the one used in the preceding run suspended in cyclohexane were supplied to the reactor of the same type described in connection with the suspension process. A stream of reactor effluent was continuously withdrawn from the reactor, heated to about 320° F. to insure complete solution of the polymer in the cyclohexane and flashed at about 100 p.s.i.g. to remove unreacted olefins. The resulting solution was then filtered at about 320° F. to remove catalyst and the resulting solution was cooled to 240° F. and contacted with water at 100° F. to precipitate the dissolved polymer. The solvent was flashed from the precipitated polymer and water mixture. The slurry of water and precipitated polymer recovered from the flashing step contains 3 percent copolymer having a bulk density of 18 pounds per cubic foot and a particle size distribution as follows:

Percent retained on No. 20 screen _____ 37.2
Percent retained on No. 30 screen _____ 27.2
Percent retained on No. 35 screen _____ 15.1
Percent retained on No. 45 screen _____ 11.3
Percent retained on No. 50 screen _____ 3.1
Percent retained on No. 60 screen _____ 2.1
Percent retained on No. 80 screen _____ 3.2
Percent retained on No. 140 screen _____ 0.9

During polymerization, a reactor temperature of 300° F. and a reactor pressure of about 420 p.s.i.g. were maintained.

The slurry of finely divided polyethylene in water is heated to a temperature of about 580° F. and then passed through a pyrolysis tube maintained at a temperature of about 600° F. The rate of flow of slurry through the pyrolysis tube is such that the residence time of the polymer in the tube is about one minute. The resulting pyrolyzed polymer is recovered by flashing water and odor bodies from the pyrolysis tube effluent. The unpyrolyzed polymer had an inherent viscosity of 1.2 and the pyrolyzed polymer had an inherent viscosity of 0.8.

The foregoing examples show that in accordance with this invention, the suspension process with all of its advantages can be used in conjunction with controlled cracking or pyrolysis of solid polymers to produce a pyrolyzed polymer which has properties comparable with that of the very desirable unpyrolyzed polymer obtained by the solution process.

Very desirable thermoplastic materials can be produced by subjecting solution-produced polymers having an inherent viscosity in the range 0.7 to 2.6, preferably 1.1 to 2.6, to cracking conditions to produce lower molecular weight products having an inherent viscosity in the range 0.4 to 1.7, preferably 0.4 to 1.0.

Polymers produced by the suspension process having an inherent viscosity of 3 to 30 can be pyrolyzed to valuable products having an inherent viscosity in the range 0.4 to 2.6.

Although the process of this invention has been described in connection with the use of the much preferred chromium-oxide catalyst and specifically in connection with the process wherein the polymerization is conducted in the presence of a liquid hydrocarbon diluent, the process in its broadest aspect is not limited to these particular features. For example, the polymerization can be conducted in the absence of a diluent, the reaction occurring in the gaseous phase and the mixture of fluidized or suspended catalyst and dry fluidized or suspended particulate non-agglutinative polymer being maintained in the reaction zone.

In density determinations the specimens should be prepared by compression molding the polymer at 340° F. until completely molten followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature.

As will be evident to those skilled in the art many variations and modifications of this invention can be practiced in view of the foregoing disclosure. Such variations and modifications are clearly believed to come within the spirit and scope of the invention.

I claim:

1. A process for pyrolyzing a normally solid polymer of a 1-olefin to form a product having a lower inherent viscosity which comprises:
(1) dispersing said polymer in particulate form in water,
(2) heating the resulting dispersion to a temperature of at least about 500° F. for a period of 1 to 10 minutes while maintaining the water in the liquid phase,
(3) flashing water from the hot dispersion thereby removing odor-forming materials from the polymer, and
(4) recovering said polymer reduced in molecular weight and odor.

2. A process according to claim 1 wherein said polymer is a solid polymer of ethylene.

3. A process for making an ethylene polymer product having controlled molecular weight which comprises:
(1) polymerizing ethylene in the presence of a solvent for the polymer formed and a catalyst to form an ethylene polymer having a density at 25° C. of at least 0.940,
(2) separating catalyst and unreacted monomer from the polymer solution thus formed,
(3) precipitating polymer in the form of particles from said solution by contacting same with relatively cool water,
(4) removing solvent from the resulting mixture to leave a slurry of finely divided polymer dispersed in water,
(5) passing said slurry through a pyrolysis zone wherein the polymer is subjected to a temperature of at least 600° F. for 1 to 10 minutes while maintaining the water present in the liquid phase through elevated pressure,
(6) passing the hot slurry into a flash zone wherein a reduced pressure is maintained so that water is flashed into vapor thereby removing water and odor-forming materials from the polymer and cooling the polymer, and
(7) recovering said ethylene polymer product.

4. A process according to claim 3 wherein said particles range from 10 to 100 mesh and have bulk density of 1 to 30 pounds per cubic foot.

5. A process according to claim 3 wherein said water containing precipitated ethylene polymer is heat exchanged with the effluent from said pyrolysis zone.

References Cited in the file of this patent

UNITED STATES PATENTS

| 2,831,846 | Edmonson et al. | Apr. 22, 1958 |
| 2,835,659 | Guillet | May 20, 1958 |
| 2,842,532 | Campbell | July 8, 1958 |

FOREIGN PATENTS

| 569,043 | Great Britain | May 2, 1945 |